United States Patent [19]
Yamaguchi et al.

[11] 4,336,707
[45] Jun. 29, 1982

[54] KNOCK DETECTING APPARATUS FOR INTERNAL COMBUSTION ENGINES

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 152,986

[22] Filed: May 27, 1980

[30] Foreign Application Priority Data

Jun. 4, 1979 [JP] Japan ............................. 54-70495
Oct. 24, 1979 [JP] Japan ............................. 54-138032

[51] Int. Cl.³ ........................................... G01L 23/22
[52] U.S. Cl. ........................................... 73/35; 73/651; 310/25
[58] Field of Search ............. 73/35, 651; 310/25; 123/425, 435

[56] References Cited

U.S. PATENT DOCUMENTS

| | | | |
|---|---|---|---|
| 1,746,171 | 2/1930 | Vatinet et al. | 310/25 |
| 2,300,638 | 11/1942 | Wente | 310/25 |
| 2,424,864 | 7/1947 | Treseder | 73/651 |
| 2,641,719 | 6/1953 | Adams | 73/35 |
| 3,513,415 | 5/1970 | Dostal | 310/25 |
| 4,275,586 | 6/1981 | Gast et al. | 73/35 |

FOREIGN PATENT DOCUMENTS

847511 9/1960 United Kingdom ............... 73/35

*Primary Examiner*—James J. Gill
*Attorney, Agent, or Firm*—Cushman, Darby & Cushman

[57] ABSTRACT

A vibrator having a resonant frequency within a knocking frequency range forms a part of a magnetic path. The vibrator vibrates in response to the vibration of an internal combustion engine and this changes the reluctance of the magnetic path. The change in the reluctance is sensed by a coil to detect the presence of knock. The vibrator is enclosed with a damper substance consisting of a liquid or sol substance having viscosity of flow properties so that the vibration of the vibrator is restricted and the Q of the resonance characteristic of the vibrator is deteriorated, thus increasing the substantial range of frequency detection of the apparatus. If necessary, the damper substance is heated to maintain its viscosity at a predetermined value.

1 Claim, 6 Drawing Figures

KNOCK DETECTING APPARATUS FOR INTERNAL COMBUSTION ENGINES

BACKGROUND OF THE INVENTION

The present invention relates to a knock detecting apparatus suitable for use with the ignition timing control apparatus of internal combustion engines, which functions so that the occurrence of knock is detected from the vibrations emitted to the outside of the engine cylinder due to the pressure therein and the ignition timing of the engine is adjusted so as to obtain the desired knock intensity.

It is well known in the art that there is a close correlation between the ignition timing and the cylinder pressure. When the mixture is exploded, in the absence of any knock there will be no superposition on the cylinder pressure of higher harmonic components (usually those frequency components in the ranges between 5 and 10 kHz and between 11 and 13 kHz or the components in the frequency bands which are determined by the bore diameter of the engine cylinders and the velocity of sound of the combustion and they are produced as the result of intermittent and rapid combustion). On the contrary, when the engine starts knocking, high frequency components start to be superposed on the cylinder pressure at around its peak value and this has the effect of causing emission of vibrations or sound to the outside of the cylinder. A close examination of the pressure signals produced in the cylinders or the variations or sound emitted to the outside of the cylinders will show that the beginning of knock (trace knock) occurs at an engine crank angle at which the cylinder pressure attains the maximum value and the knock is gradually increased (to light knock and heavy knock) causing the resulting higher harmonic components to begin to superpose considerably on the cylinder pressure at an earlier crank angle than that corresponding to the maximum cylinder pressure value (or on the ignition side). Thus, the engine efficiency will be increased greatly if the vibrations or sound emitted by knocking to the outside of the cylinders is detected with a high degree of accuracy and fed back to control the ignition timing. However, presently no detecting apparatus has been proposed which is capable of detecting the presence of knock or feedback factor with improved accuracy and which is also operable stable under severe environmental conditions required for vehicles.

Prior art detecting apparatus of the above type include those which employ the ordinary piezoelectric type accelerometers and resonant type detecting apparatus which has been investigated by the inventors. The ordinary accelerometer type is disadvantageous in that its resonant frequency is above the frequency band in which knock occurs and the detecting characteristic becomes flat for the frequencies below the knocking frequency (this type is hereinafter referred to as a nonresonant type). The resonant type has a resonant frequency within the knocking frequency band and thus it has a high sensitivity to the frequencies around the resonant frequency as compared with the other frequencies. However, in view of the nature of resonance, any attempt to increase the resonance sharpness Q inevitably tends to decrease the range of detectable frequencies.

Another disadvantage of the nonresonant type is that the S/N ratio of the apparatus is deteriorated by engine vibration noise so that even if the range of frequency detection is increased from the principal point of view, the detection of knock at high engine speeds will be made practically impossible due to such noise. On the other hand, the resonant type is excellent in both S/N ratio and sensitivity and thus its knock detecting capacity is much improved as compared with that of the nonresonant type. However, due to its high Q value and reduced frequency detection range, it has been the tendency of the resonant type to find it increasingly difficult to detect the occurrence of knocking if the knocking frequency distribution varies with the progress of combustion. This means that while the occurrence of knock is distributed over a wide frequency range, the resonant type detecting apparatus cannot ensure a uniform sensitivity characteristic (or a trapezoidal characteristic) in the frequency band and thus it is capable of detecting only a relatively narrow range of frequencies. While this detecting characteristic can still be said to be excellent as compared with that of the nonresonant type, it appears that if the knock detecting accuracy is to be improved further, it is desirable to ensure a trapezoidal sensitivity characteristic having a wide detection range even if the sensitivity of the apparatus is deteriorated as the result of the reduced Q.

SUMMARY OF THE INVENTION

It is the object of the present invention to provide a knock detecting apparatus capable of detecting the knocking frequency over a relatively wide frequency range with a high degree of accuracy.

To accomplish the above object, in accordance with the present invention a resonant knock detecting apparatus of the type employing vibrating means, responsive to knocking so as to resonate at the knocking frequency, is provided with damper means disposed around the vibrating means so as to limit the vibration velocity of the vibrating means and thereby to decrease the Q of resonance and relatively increase the range of frequency detection.

DESCRIPTION OF THE PREFERRED EMBODIMENTS

Figure 1:
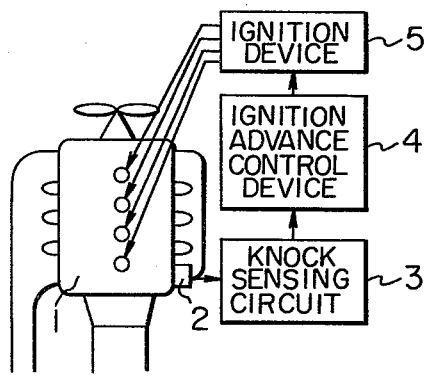
FIG. 1 is a schematic block diagram showing a knock feedback type ignition system with which a knock detecting apparatus according to the present invention is used.

Referring first to FIG. 1, there is illustrated a schematic block diagram of a knock feedback type ignition system incorporating the knock detecting apparatus according to the invention. In the Figure, numeral 1 designates an in-line type four-cylinder internal combustion engine, and 2 a knock detecting apparatus mounted to the cylinder block of the engine 1 by means of a screw or the like. Numeral 3 designates a knock sensing circuit for sensing the knocking of the engine 1 from the output signal of the knock detecting apparatus 2, and 4 an ignition advance control device responsive to the output of the sensing circuit 3 to advance or retard the ignition timing to the optimum ignition position. The output signal of the control device 4 is applied through a known type of ignition device 5 to the spark plugs mounted in the engine 1 so as to ignite the air-fuel mixture. The knock sensing circuit 3 used in this system senses the ignition signal which is not shown, and the presence of knock is sensed by sampling the noise components caused by the engine vibrations during a certain time interval or certain crank angle degrees in accordance with the output of the detecting apparatus 2 and comparing the same with the output of the detecting apparatus produced during a certain time interval or certain crank angle degrees after the top dead center (TDC) or after the peak cylinder pressure (the comparison may sometimes be made with the integrated or averaged value). Alternatively, the presence of knock may be sensed by means of a single signal by a probability process. For instance, the presence of knock may be sensed in accordance with the percentage of knocking events in 100 times of ignition. The ignition advance control device 4 advances or retards the ignition timing in accordance with the presence or absence of knocking. While the knock sensing circuit 3 and the ignition advance control device 4 are known in the art and their detailed constructions will not be described, the apparatus of this invention can be apparently used with any types of such circuit and device provided that the presence of knock is sensed and the ignition timing is controlled accordingly.

Figure 2A:
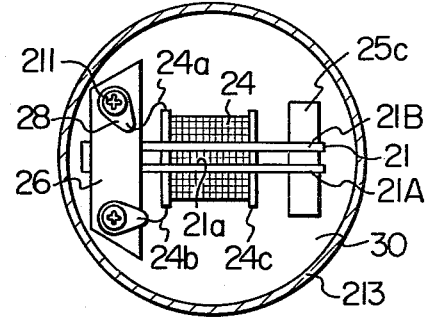
FIGS. 2A and 2B are a cross-sectional view and a longitudinal sectional view showing an embodiment of the detecting apparatus according to the invention.
Figure 2B:
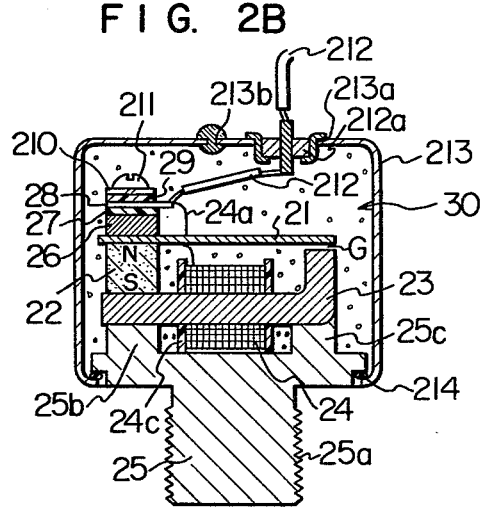

The knock detecting apparatus of the present invention will now be described in detail. In FIGS. 2A and 2B showing a first embodiment of the invention, numeral 21 designates a vibrating means made of a magnetic material (e.g., iron or any of iron-nickel alloys) and having resonant frequencies so as to be resonant at knocking frequencies ranging from 5 to 10 kHz, and the vibrating means 21 has its one end fixedly secured so as to vibrate in a cantilever manner (the vibrating means will hereinafter be referred to as a reed means). The reed means 21 includes a slit or cut 21a formed in its free end portion so as to provide a pair of vibrating reeds (or reed members) 21A and 21B which vibrate so as to be resonant at different frequencies. Numeral 22 designates a magnet having a magnetic force, and 23 an L-shaped core of a material such as iron-nickel alloy or ferrite so as to form a magnetic path in association with the reed means 21 and the magnet 22. The magnetic path includes a gap G defined between the core 23 and the reed members 21A and 21B, respectively. As a result, when the reed means 21 vibrates, the gap G varies and the magnetic reluctance of the magnetic path varies correspondingly. Numeral 24 designates a coil for sensing variations in the magnetic flux.

A coil bobbin 24c is formed with a hole through it so as to allow the core 23 to extend through the center thereof, and the coil conductor is wound on the outer surface of the bobbin 24c. The bobbin 24c is secured to the core 23 by means of an adhesive or the like so as to prevent any variation in the relative position of the coil 24 and the core 23 from varying the number of passing magnetic flux. Numeral 25 designates a housing made of iron, brass or the like and formed in the lower part with a threaded portion 25a for fastening the apparatus to the engine cylinder block and in the upper part with supports 25b and 25c on which is mounted the core 23. Numeral 26 designates a keep bar for holding the previously mentioned magnetic path forming components in place, and one end of the reed means 21, the magnet 22 and the core 23 are firmly secured, along with insulating sheets 27 and 29, lug pieces 28 (to which are attached coil output terminals 24a and 24b and a washer 210) are secured to the support 25b of the housing 25 by means of screws 211. The coil output terminals 24a and 24b are attached to the lug pieces 28 by soldering or caulking and then connections to the outside are provided by means of lead wires 212. Numeral 213 designates a cover attached by caulking to the housing 25 with a sealing material 214 of rubber or the like interposed therebetween, and a sealing insulator 212a is fitted in a hole 213a through which the lead wires 212 are brought out. The coil output is taken out through the electrodes of the sealing insulator 212a (e.g., a sealing terminal made of a glass sealing material which is referred to as a hermetic seal). Thus, the knock detecting apparatus is hermetically sealed. Numeral 213b designates a damper substance fill opening formed in the cover 213, and the opening 213b is sealed by soldering or the like after the damper substance has been introduced. Numeral 30 designates a damper substance for dampening vibrations of the reed means 21 and it consists of silicone oil, insulating oil or the like having fluidity and a high degree of electrical insulation or a soft resin material. The inside of the cover 213 is filled partly or fully with the substance which serves as a damper. The thus constructed detecting apparatus 2 is firmly attached to the cylinder block by the threaded portion 25a so that the detecting apparatus 2 vibrates together with the cylinder block.

The operation of the detecting apparatus 2 will now be described. The detecting apparatus 2 is secured to the cylinder block by screwing the threaded portion 25a thereinto as mentioned previously. The vibrations induced in the cylinder block by knocking are transmitted to the reed means 21 by way of the housing 25. Since the reed means 21 is firmly secured only at its one end, the reed means 21 vibrates in accordance with the frequency and strength of the vibrations as well as the natural vibration of the reed means itself. In this case, the core 23, the coil 24 and the magnet 22 are firmly mounted in place so as to vibrate together with the housing 25 and consequently only the reed means 21 is permitted to vibrate relative to the other members in the magnetic path in response to the knock induced vibrations causing the distance of the gap G to vary with the knock induced vibrations. It is preliminarily designed so that a predetermined magnetic flux passes through the reed means 21 from the magnet 22 and consequently a variation in the gap G varies the amount of the magnetic flux passing through the magnetic path. The coil 24 detects the variation in the magnetic flux or the knock induced vibrations as a voltage. The detected voltage signal is applied to the knock sensing circuit 3 through the lead wires 212. In this case, since the damper substance 30 is put around the vibrating reed means 21, generally the reed means 21 is subjected to a resistance which is proportional to the square of its velocity and this limits the free vibration of the reed means 21. This fact serves as a factor which decreases the Q.

While it is desirable that the knock detecting apparatus be capable of responding readily only to the vibration due to engine knock so as to sense the knock induced vibrations, it has been the tendency of the known resonant type to allow the damped vibrations to last over a relatively long time interval even after the termination of the knock. This time interval increases with an increase in the Q of resonance and in certain cases the time interval lasts until the combustion process of the next cylinder. This makes it difficult to distinguish knock from vibration noise when sensing the knock, and there is the danger of causing an erroneous operation in cases where a comparison is made between such noise and a knock signal so as to improve the S/N ratio. The use of a damper substance has the effect of automatically reducing the duration of vibrations, eliminating the occurrence of erroneous operations, greatly reducing the detection error and simplifying the control method due to the elimination of masking, etc. Also, while the effect of a damper is generally determined by the square of velocity of a vibrator, generally a resonant characteristic having a high Q results in the detection of a signal having a particularly high resonance peak and its effect is increased with an increase in the Q. If it is allowed to go to extremes, resonance at a frequency of 8 kHz, for example, results in the detection of only 8 kHz. In practice, however, such an extreme case never takes place and frequencies at and near the resonance peak will be detected. The velocity and amplitude of a vibrator attain the maximum at the resonance peak and the damper effect becomes maximum at this point. Thus, as compared with the resonance characteristic with no damper substance, the sensitivity to the frequencies near the resonant frequency is deteriorated most and the sensitivity deteriorates diminishingly with deviation from the resonant frequency. Thus the resonance characteristic comes relatively closer to the trapezoidal characteristic of an ideal detecting apparatus, with the result that a satisfactory knock detection is ensured even if the knocking frequency deviates from the resonant frequency and the range of frequency detection is also increased. However, the maximum sensitivity is deteriorated conversely. While, in the first embodiment, the vibrating reeds 21A and 21B of the reed means 21 are designed to respectively resonate at frequencies of 7.5 kHz and 8 kHz, they may be designed to resonate at any frequencies provided that these frequencies exist in the knocking frequency band. In other words, the introduction of the damper substance 30 does not particularly increase the sensitivity of the apparatus to the resonant frequencies alone but ensures the sensitivity of relatively closer orders to the frequencies near the resonant frequency. As a result, there is no danger of those signals corresponding to the resonant frequencies alone being detected as if they were the only knock signals, and a satisfactory knock detection is ensured even against any variations of the knocking frequency distribution involving deviations from the resonant frequencies. Thus, as compared with the known apparatus which are simply constructed as the resonant type, a much greater detection tolerance is provided and there is a great advantage from the standpoint of stability.

The damper substance is not limited to silicone oil and insulating oils and other substances including insulating liquids or elastic substances (e.g., soft hardening agents such as silicone rubber) and sol substances such as potting agents may also be used. However, the use of substances which are excessively hard must be carefully considered since they tend to limit excessively the vibrations themselves.

Figure 3:
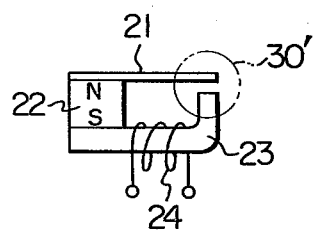
FIG. 3 is a front view showing schematically a second embodiment of the detecting apparatus according to the invention.

In the above-described embodiment, the vibrating means itself is completely enclosed by the damper substance. The purpose of the damper substance is to limit the vibrations of the vibrating means, and no difficulty will be caused even if the vibrating means is enclosed only partly by the damper substance. FIG. 3 shows a second embodiment in which a sol damper substance 30' (e.g., a soft resin or sol silicone potting agent) is placed between the end of the reed means 21 and the core 23 forming the magnetic path for magnetic detection in association with the former.

In accordance with the second embodiment, the damper can be provided by a simple procedure, and in particular the desired characteristic can be obtained satisfactorily even if the detecting apparatus is not hermetically sealed. However, it is desirable to hermetically seal the apparatus from the standpoint of durability and stability.

Figure 4:
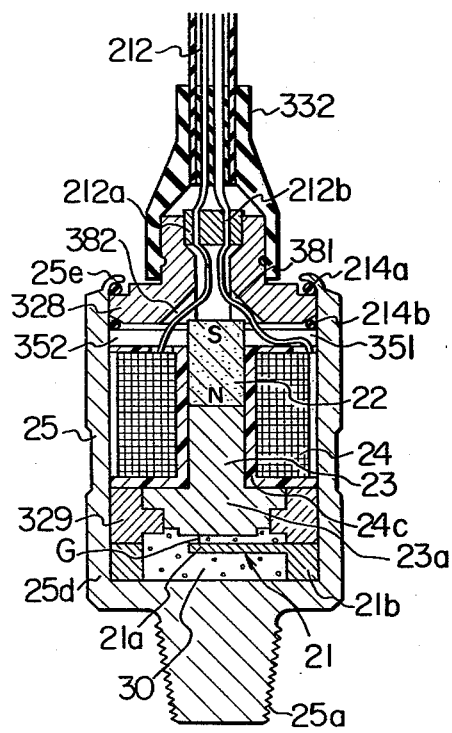
FIG. 4 is a longitudinal sectional view showing a third embodiment of the detecting apparatus according to the invention.

Referring to FIG. 4, there is illustrated a third embodiment of the knock detecting apparatus according to the invention. The knock detecting apparatus shown in FIG. 4 is characterized in that the apparatus is formed into substantially a cylindrical shape and its reed means is disposed on the side of the apparatus which is fastened to the cylinder block, and the same reference numerals and symbols as used in FIGS. 2A and 2B designate the component parts which are identical or equivalent in function.

In the third embodiment shown in FIG. 4, numeral 21 designates a reed means comprising a reed member 21a which is in sheet form is and resonant at a knocking frequency of 5 to 10 kHz and a ring supporting member 21b for supporting the reed member 21a, and these members are formed integrally from a single magnetic material (e.g., iron or iron-nickel alloy). One end of the reed member 21a is supported by the supporting member 21b. A magnet 22 has a cylindrical shape and it is magnetized in the axial direction so that the upper side forms a south pole and the lower side forms a north pole in FIG. 4. A core 23 consists of a bar magnetic material having an axially extended cylindrical shape and it is formed at the lower end with a collar portion 23a which faces the reed member 21a to define a gap G therebetween. The upper end of the magnetic material is in contact with the north pole of the magnet 22. A coil 24 is wound around the bar magnetic material 23 through the intermediary of a resin bobbin 24c to provide magnetic flux sensing means and it is disposed in such a manner that its axial direction is at right angles to the lengthwise direction of the reed member 21a. The supporting member 21b of the reed means 21 is closely bonded to the inner bottom surface of a cup housing 25. Numeral 329 designates a ring spacer made of a non-magnetic material such as aluminum, copper alloy, stainless steel or the like and it has its lower end fixedly bonded to the supporting member 21b of the reed means 21, its intermediate portion disposed to hold the collar portion 23a of the bar magnetic material 23 in place and its upper end disposed to hold the bobbin 24c in place in association with the collar portion 23a. In this case, the spacer 329 is closely fitted by driving in the housing 25 and the collar portion 23a of the bar magnetic material 23 is closely fitted by driving in the middle portion of the spacer 329. Thus, the space defined around the reed means 21 by the housing 25, the sensor 329 and the collar portion 23a of the bar magnetic material 23 is hermetically sealed and only this hermetically sealed space is filled with a viscous substance 30 such as an insulating oil or soft resion material. In this case, to make more reliable the hermetic sealing of the space filled with the viscous substance 30, an O-ring may be placed at the contact surface between the outer surface of the spacer 329 and the housing 25 and at the contact surface between the inner surface of the spacer 329 and the collar portion 23a of the bar magnetic material 23.

Since the spacer 329 is made of the non-magnetic material, it is designed in an optimum manner so that the magnetic reluctance between the collar portion 23a of the bar magnetic material 23 and the housing 25 has a sufficiently large value which is effectively close to that of an air gap. The housing 25 has its side peripheral wall formed into substantially a cylindrical shape and it is made of a magnetic material such as iron or iron-nickel alloy. The housing 25 is formed in the lower part with a threaded portion 25a for fastening the housing 25 to the cylinder block and it also includes a wrench hexagon portion 25d for fastening the housing 25 to the engine cylinder block by means of the threaded portion 25a. Of these component parts, those including the reed means 21 which are likely to rust will sometimes be plated with a magnetic material such as nickel or cobalt. Numeral 328 designates a sealing plate for hermetically sealing the apparatus to protect the same from external moisture, dirt, etc., and it also forms the diametrical magnetic path portion. The sealing plate 328 which is made of a magnetic material, is driven into or fitted into the open end of the housing 25 and it is fixedly mounted in place by caulking a caulking portion 25e at the open end of the housing 25 through the intermediary of a sealing O-ring 214a. Firmly fitted onto the plate 328 is a hermetic seal 212a having signal take-out terminals 212b fixedly embedded therein. The ends of the coil 24 are connected to the terminals 212b by which the coil ends are further connected to external signal lines 212. Numeral 332 designates a rubber bushing which covers the junction of the signal lines 212 and the terminals 212b, and 214b an O-ring placed between the plate 328 and the bobbin 24c. The lower end of the plate 328 is closely bonded to the south pole of the magnet 22 and if necessary, a molding resin will be introduced into the housing 25 except around the reed means 21 or alternately, the magnet 22, the coil 24 and the bar magnetic material 23 can be fastened together by an adhesive to prevent variation of the passing magnetic flux due to variation in the relative position of these components. Numerals 351 and 352 designate slit grooves formed in the bobbin 24c to bring out the ends of the coil 24. Numerals 381 and 382 designate slit grooves formed in the plate 328 to bring out the ends of the coil 24. In this detecting apparatus, a magnetic path is formed by the north pole of the magnet 22, the bar magnetic material 23, the gap G, the reed means 21, the housing 25, the sealing plate 328 and the south pole of the magnet 22. Thus, in this embodiment, the center magnetic path portion is formed by the magnetic material 23 and the magnet 22, the diametrical magnetic path portion is formed by the sealing plate 328 and the outer peripheral magnetic path portion is formed by the side peripheral wall of the housing 25.

In accordance with the thus constructed embodiment, the viscous substance 30 provides the same damper effect as in the case of the first embodiment shown in FIGS. 2A and 2B and thus the range of detectable knocking frequencies is increased, though the Q of the resonant characteristic is deteriorated.

Figure 5:
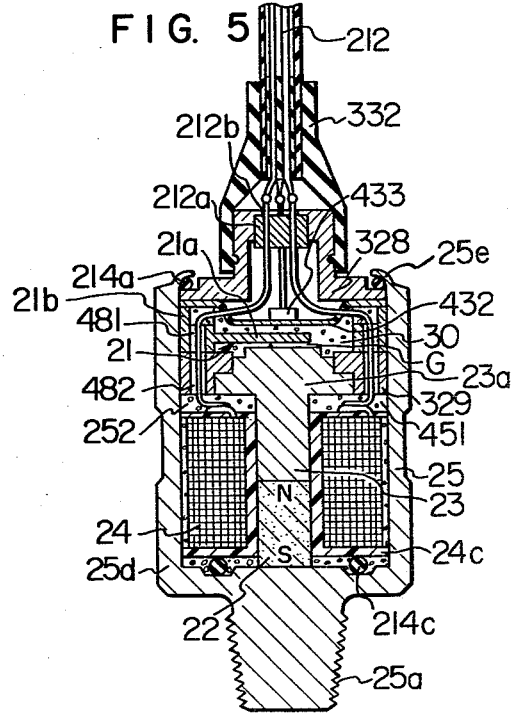
FIG. 5 is a longitudinal sectional view showing a fourth embodiment of the detecting apparatus according to the invention.

FIG. 5 shows a fourth embodiment of the detecting apparatus according to the invention which differs from the third embodiment of FIG. 4 in that the reed means 21, the magnet 22, the bar magnetic material 23 and the spacer 329 are reversed in position with one another and that the housing 25 is filled completely with the viscous substance 30. In this Figure, the same reference numreals as used in FIG. 4 designate the same or equivalent components as their counterparts in FIG. 4. In FIG. 5, numeral 214c designates an O-ring placed between the bobbin 24c and the inner bottom surface of the housing 25, and 481 and 482 are holes formed through the supporting member 21b of the reed means 21 and the spacer 329 so as to lead the ends of the coil 24 to the terminals 212b. In this embodiment, the diametrical magnetic path portion is formed by the bottom wall of the housing 25, the outer peripheral magnetic path portion is formed by the side peripheral wall of the housing 25 and the central magnetic path portion is formed by the magnetic material 23 and the magnet 22. With this construction, as in the case of the third embodiment, the coil 24 generates a knock detection output from the vibration of the reed means 21 and the free vibration of the reed member 21a is limited by the damper effect of the viscous substance 30. Further, since the viscous substance 30 is also placed in the vicinity of the coil 24 and the bobbin 24c, it is necessary to form the coil 24 and the bobbin 24c with materials which are not likely to be deteriorated by the viscous substance 30 or alternatively it is necessary to use the viscous substance 30 consisting of a material which will not deteriorate the coil 24 and the bobbin 24c.

In FIG. 5, numeral 432 designates a metal plate made of a nonmagnetic material (a nonmagnetic material is preferred, though a magnetic material is also usable) and disposed so that its edge portion is held between the supporting portion 21b of the reed means 21 and the sealing plate 328. Mounted fixedly on the metal plate 432 is a positive characteristic thermistor 433 such as the PCT thermistor (trade name) the resistance value of which rapidly increases at a predetermined temperature (any other small heating means may also be used). Thus, when current is supplied to the thermistor 433, it generates heat upon reaching a predetermined temperature so that the viscous substance 30 is heated to a predetermined temperature and the viscosity of the viscous substance 30 is always maintained at a predetermined value irrespective of the ambient temperature, thus maintaining the damper effect of the viscous substance 30 on the reed means 21 at a predetermined value. The leads of the thermistor 433 are connected to an external power supply through the terminals 212b and the signal lines 212. In this case, one of the leads may be connected to the metal plate 432 so as to be grounded by the engine cylinder block through the plate 328 and the housing 25. On the other hand, in connecting the leads of the thermistor 433 to the outside through the terminals 212b and the signal lines 212, the metal plate 432 may be replaced with a plastic sheet having good heat conducting properties.

While the coil 24 is used as magnetic flux sensing means in the above-described embodiments, it is possible to use a magneto-resistance element or Hall generator.

Further, while, in the above-described embodiments, the magnet 22 is used as a means of supplying magnetic flux to the magnetic path, it is possible to use an exciting coil wound around the magnetic path or alternatively the coil 24 may be connected to an oscillator so that a change in the reluctance of the magnetic path caused by the vibration of the reed means 21 is sensed as a variation of the oscillator load, thus eliminating the need to provide any means for supplying magnetic flux to the magnetic path.

Further, while, in these embodiments, the housing 25 includes the mounting threaded portion 25a and the wrench hexagon portion 25d and the sealing plate 328 includes the terminals 212b, it is possible to design the structure so that the housing 25 includes the terminals 212b and the sealing plate 328 includes the mounting threaded portion 25a and the wrench hexagon portion 25d.

Further, while, in these embodiments, the outer peripheral magnetic path portion and the diametrical magnetic path portion are respectively provided by the housing 25 and the sealing plate 328 concurrently, it is possible to provide the outer peripheral and diametrical magnetic path portions with a separate magnetic cylindrical member provided inside the housing 25 in addition to the housing 25 and the sealing plate 328.

We claim:

1. A knock detecting apparatus for an internal combustion engine comprising:
   vibrating means having at least one resonant frequency within a knocking frequency range;
   magnetic means arranged to form a magnetic path in association with said vibrating means, said magnetic path including a gap formed between said vibrating means and said magnetic means;
   means connected to said magnetic means to generate magnetic flux in said magnetic path;
   magnetically sensitive means connected to said magnetic means to sense a change in said magnetic flux in said magnetic path caused by the vibration of said vibrating means;
   a housing secured to an internal combustion engine, said housing having said vibrating means, magnetic means, flux generating means and magnetically sensitive means mounted thereon, the housing including a side peripheral wall portion formed into a substantially cylindrical cup shape, said vibrating means being disposed within the housing such that the vibrating means has its lengthwise direction arranged in a diametrical direction of said housing, the magnetic means being disposed within the housing less remote from the engine than said vibrating means and arranged such that its lengthwise direction is along an axial direction of said housing, said housing further including plate means positioned within the housing so as to be more remote from the engine than said vibrating means, the housing and said plate means defining a space filled with damper means which surrounds the vibrating means so as to restrict the vibration thereof; and
   heating means mounted on the plate means to heat the damper means through the plate means.

* * * * *